(12) United States Patent
deJong

(10) Patent No.: US 7,572,064 B2
(45) Date of Patent: Aug. 11, 2009

(54) OPTICAL FIBER MECHANICAL SPLICE CONNECTOR

(75) Inventor: Michael deJong, Colleyville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/491,556

(22) Filed: Jul. 24, 2006

(65) Prior Publication Data

US 2008/0019646 A1   Jan. 24, 2008

(51) Int. Cl.
   *G02B 6/38* (2006.01)
(52) U.S. Cl. .............................. 385/65; 385/55; 385/58; 385/67; 385/70
(58) Field of Classification Search ................... 385/55, 385/56, 58, 60, 62, 65, 66, 67, 70, 72, 75, 385/95–99
See application file for complete search history.

(56) References Cited

U.S. PATENT DOCUMENTS

| | | | | |
|---|---|---|---|---|
| 3,871,744 | A * | 3/1975 | Bridger et al. ................. | 385/84 |
| 4,030,809 | A | 6/1977 | Onishi et al. ............... | 350/96 C |
| 4,257,674 | A | 3/1981 | Griffin et al. ............. | 350/96.21 |
| 4,755,018 | A | 7/1988 | Heng et al. ............... | 350/96.21 |
| 4,877,303 | A | 10/1989 | Caldwell et al. ......... | 350/96.21 |
| 4,923,274 | A | 5/1990 | Dean ........................ | 350/96.21 |
| 4,964,688 | A | 10/1990 | Caldwell et al. ............ | 350/96.2 |
| 5,040,867 | A | 8/1991 | deJong et al. .................. | 385/60 |
| 5,067,226 | A | 11/1991 | Egner et al. .................... | 29/452 |
| 5,261,020 | A | 11/1993 | deJong et al. .................. | 385/76 |
| 5,394,496 | A * | 2/1995 | Caldwell et al. ............... | 385/70 |
| 5,694,506 | A | 12/1997 | Kobayashi et al. ............ | 385/60 |
| 6,033,124 | A * | 3/2000 | Lesueur et al. ................ | 385/53 |
| 6,173,097 | B1 | 1/2001 | Throckmorton et al. ....... | 385/59 |
| 6,379,054 | B2 | 4/2002 | Throckmorton et al. ....... | 385/66 |
| 6,439,780 | B1 | 8/2002 | Mudd et al. ................... | 385/83 |
| 6,442,318 | B1 | 8/2002 | Goldman .................... | 385/114 |
| 6,582,134 | B2 * | 6/2003 | Otera .......................... | 385/65 |
| 6,816,661 | B1 | 11/2004 | Barnes et al. ............... | 385/134 |
| 6,931,193 | B2 | 8/2005 | Barnes et al. ............... | 385/134 |
| 2003/0142921 | A1 * | 7/2003 | Dallas et al. .................. | 385/80 |

(Continued)

FOREIGN PATENT DOCUMENTS

WO   WO2005/004285 A2   1/2005

OTHER PUBLICATIONS

Siecor® CAMLITE™ Multimode Connector Procedure for Laser Usage, SRP-006-046, CIRCA 1991, 2 pages.

(Continued)

*Primary Examiner*—Charlie Peng

(57) ABSTRACT

An optical fiber mechanical splice connector including a connector body having a fiber alignment mechanism and a cavity, and a ferrule including a stub fiber, wherein an end of the stub fiber extends from the ferrule through the cavity of the connector body and into the fiber alignment mechanism, and wherein the stub fiber buckles within the cavity when a field fiber is introduced into the connector body and contacts the distal end of the stub fiber. A mechanical splicing method including inserting a field fiber into a splice connector such that an end of the field fiber contacts an end of the stub fiber within an alignment mechanism of the splice connector, and applying axial force to the field fiber so as to cause the stub fiber to buckle within a cavity defined by the splice connector.

16 Claims, 10 Drawing Sheets

U.S. PATENT DOCUMENTS

2004/0071407 A1* 4/2004 Vergeest ............. 385/58
2005/0036744 A1 2/2005 Caveney et al.
2005/0226566 A1* 10/2005 Sasaki et al. ............. 385/55

OTHER PUBLICATIONS

Siecor® CAMLITE™ Connector Laser Assembly Aid Instructions, SRP-006-048, Issue 3, Sep. 1991, 6 pages.
Panduit Installation Instructions for SC OPTICAM Fiber Optic Connectors, six pages, 2005.
Panduit Specification Sheet for SC OPTICAM™ Pre-Polished Fiber Optic Connectors, two sheets, Aug. 2005.
NORDX/CDT Spec Sheet, FiberExpres Solutions—Optimax Field Installable Connector, two pages, no date.
International Application Published Under the Patent Cooperation Treaty, International Search Report, Publication No. WO 2008/013767 A3, Jan. 31, 2008, 2 pages.

* cited by examiner

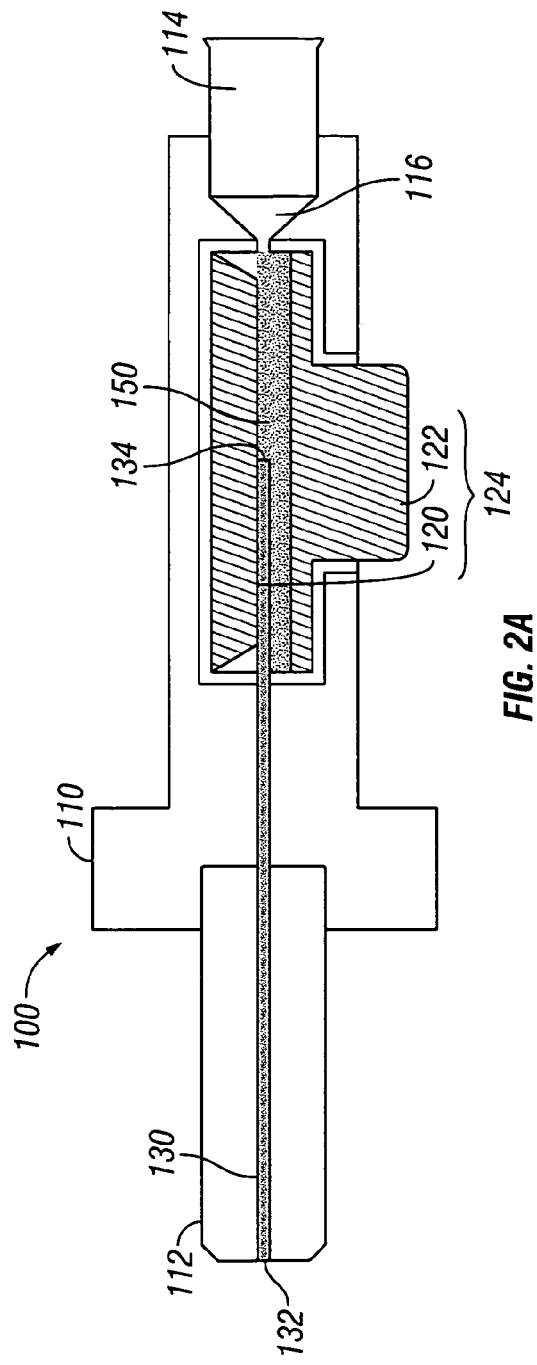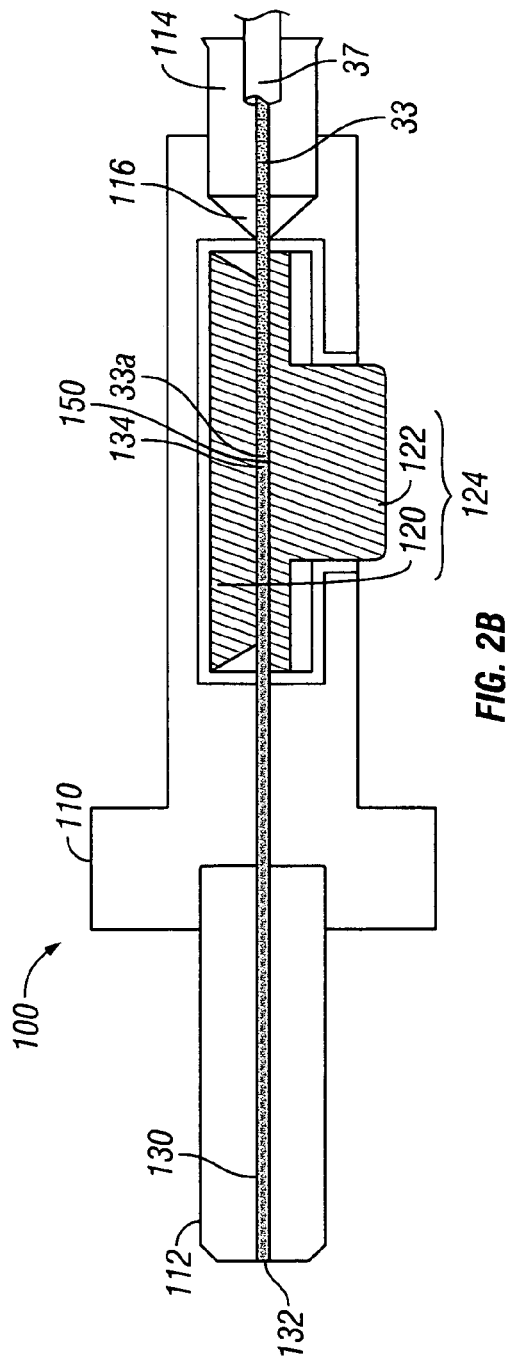
FIG. 2A (Prior Art)
FIG. 2B (Prior Art)

OPTICAL FIBER MECHANICAL SPLICE CONNECTOR

BACKGROUND OF THE INVENTION

1. Field of the Invention

The present invention relates generally to improved fiber optic connectors and, more specifically, to mechanical splice connectors that do not require the use of an index matching gel.

2. Technical Background

Optical fibers are widely used in a variety of applications, including the telecommunications industry in which optical fibers are employed in a number of telephone and data transmission applications. Due, at least in part to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home, or in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals are required. However, in order to efficiently couple the signals transmitted by the respective optical fibers, a fiber optic connector must not significantly attenuate or alter the transmitted optical signals. In addition, the fiber optic connector must be relatively rugged and adapted to be connected and disconnected a number of times in order to accommodate changes in the optical fiber transmission path.

A wide variety of factory and field-installed fiber optic connectors are known in the prior art. It is desired to have an optical fiber connector that is inexpensive to manufacture, easy to install and is capable of withstanding a wide range of environmental factors. In factory-installed connector designs, the connector is coupled with the end of one or more optical fibers during a factory assembly process. Factory installation of the fiber optic connectors onto the end of the optical fibers allows for increased accuracy in the assembly and construction of the connector and avoids the environmental and technical problems associated with field installation.

However, it is not always possible to factory install fiber optic connectors on the termination ends of optical fibers in every situation. For example, in widely-deployed networks, the optical fiber that terminates at the customer's premises, known as a field fiber, can vary in the desired length. Similarly, optical fiber installed within a structure may require optical fiber runs ranging from just a few feet to several hundred feet. Furthermore, the physical space limitations may not permit storage of excess fiber length that naturally results when installation is limited by a small number of available fiber lengths. With such varying lengths and the desire to minimize any excess slack on the ends of the optical fiber runs, it is simply not practical to install factory connectors on the fiber because of the uncertainty and variability in the length of field fiber.

Consequently, field-installable optical fiber connectors have been developed which can be coupled onto an end portion of an optical fiber in the field once the particular application and length of the optical fiber has been determined. Although alternative types of connectors are available, one of the most common forms of field-installable connectors is the mechanical splice connector. Mechanical splice connectors create a physical mating between the ends of mating optical fibers. Frequently, these mechanical splice connectors use an internal fiber contained within the connector to mate to the inserted field fiber within the connector. The internal fiber, commonly known as a "stub fiber" or "fiber stub", usually extends from about the end of a ferrule to approximately halfway along the length of the connector. This stub fiber is factory polished at the ferrule end, enabling the ferrule and stub to be readily mated with another connector after installation of the connector. The other end of the stub fiber may be either cleaved or polished in the factory and provides a mating surface for engaging with an inserted field fiber.

Performance of an optical junction between two fibers includes several important parameters, such as forward power loss (usually referred to as insertion loss) and reflected power (reflectance or return loss). Insertion loss decreases the power available at the receiver, increasing the likelihood of data disruption or corruption. Reflectance causes noise in the optical signal and can affect transmitter function. Insertion loss is primarily affected by lateral misalignment of fibers at a junction. Angular misalignment and separation between fibers also contribute to insertion loss. Reflectance is primarily affected by a change in index of refraction along the optical path, such as would happen if the light signal passes from glass (n=1.468) to air (n=1), and can be calculated using Fresnel's equations. A junction with large reflected power will also suffer measurable insertion loss as power is reflected instead of transmitted. For example, a fiber to air interface with a reflectance of approximately −14.7 dB, will incur approximately a 0.3 dB insertion loss due to reflection. For reference, a good optical junction such as a precision splice or connector will incur a 0.05 to 0.25 dB insertion loss, and −40 to −65 dB reflectance.

One of the more important aspects of installing a mechanical splice connector is ensuring that the stub fiber and inserted field fiber are accurately aligned to ensure minimum insertion loss across the fiber-fiber interface. A number of mechanisms are known in the prior art to accomplish the task of accurately aligning the optical fibers, including V-grooves and camming mechanisms. Alignment mechanisms in the art ensure that the core of the fiber stub and the core of the field fiber are accurately aligned and the field fiber is then locked into position. After the optical fibers are aligned and the field fiber is locked into position, the alignment between the fiber stub and the inserted field fiber must be precisely maintained to provide a consistent, reliable connection. Proper alignment however ensures only good insertion loss. To minimize reflectance, index of refraction changes must be eliminated from the optical path.

In order to accomplish this in prior art mechanical splice connectors, it is known to fill the connectors with index matching gel. Index matching gel has an index of refraction that is very close to that of the core of the optical fibers when the temperature of the connector is maintained at room temperature. If the fiber stub and the field fiber are not precisely contacting due to minute variations in cleave angle or surface topography of the fiber ends, the index matching gel enhances the transfer of the optical signal between the fiber stub and field fiber by eliminating air gaps which would yield reflections and insertion loss. The index matching gel therefore results in a smaller insertion loss of the optical signal within the connector. The resulting connector provides a reliable and consistent optical connector when the temperature of the connector is maintained within a small range. Another method of creating and maintaining a physical connection without index of refraction change between the fiber stub and the inserted field fiber is to use an axial load on either the field fiber or fiber stub forcing the respective fiber in engagement with the other to eliminate any air from the interface even under varying temperature conditions. This is commonly referred to as creating "physical contact" between the optical fibers. One method known in the art of providing the axial load is to use spring force within the optical connector. However, both of these methods have disadvantages.

A disadvantage of using index matching gel is that the refractive index of the gel varies with the temperature of the gel and with the wavelength of the transmitted light. Although the refractive index of any material may vary with changes in temperature, liquids and gels, such as the index matching gel, are more susceptible to changes in refractive index than a solid, such as an optical fiber, for a given change in temperature. The net result is that as the temperature of the connector diverges from room temperature the respective refractive indices of the optical fibers and the index matching gel diverge as well. Even small differences in the refractive index of the index matching gel and the optical fiber can result in significant increases in reflectance at the interface. Therefore, while index matching gel is extremely effective in indoor applications where the temperature of the connector does not vary significantly, it is a poor choice for outdoor applications where the temperature variations can cause the internal reflectance of the connector to be poor and unreliable. The wavelength dependence of index of refraction in index matching gel makes it more difficult to precisely match the index of refraction of the gel to the fiber in order to achieve low reflectance at multiple wavelengths. This leads to a compromise value of gel index of refraction even at room temperature. Thus, in theory, better performance can be achieved with physical contact than with index matching gel, even at room temperature.

In prior art designs that eliminate the use of index matching gel, the spring loading of a field fiber or installed field fiber to provide an active force between the two also has its disadvantages. Most notably, the use of a spring load requires the inclusion of a spring within the design of the optical connector. As the optical connectors are reduced in size to increase the number of connectors that may be fitted within a given space, the difficultly in designing an optical connector with a spring load increases. Additionally, as the number of components utilized within an optical connector increases, the corresponding cost per unit also increases. It would be desirable to provide an optical connector that can provide an axial load on either the field fiber or fiber stub without the use of a spring. The resulting optical connector would have the same properties as a spring-loaded optical connector, but with less complexity and lower cost.

Accordingly, it would be advantageous to have a mechanical splice connector that is robust and has predictable reflectance properties across a wide range of temperatures. Such a connector should eliminate the use of index matching gel to enhance temperature stability, but should not rely on the complexity of a spring-loading mechanism to maintain physical contact between the field fiber and the fiber stub. The connectors known in the prior art do not address these needs.

In view of the aforementioned shortcomings, improved apparatus and method for performing mechanical splice terminations are needed.

SUMMARY OF THE INVENTION

In one aspect, the present invention provides a robust and reliable connector for an optical fiber cut to length in the field. The optical fiber is cut to any length desired and the optical fiber is stripped of any protective layers along a short length at the end of the optical fiber. The optical fiber is inserted into the mechanical splice connector. An alignment mechanism ensures accurate alignment of the optical fiber with an internal fiber stub located within the optical connector.

In one embodiment, the present invention provides a mechanical splice connector including a cavity within the optical connector to allow for controlled bending or buckling of the stub fiber within the optical connector. The cavity permits the fiber stub contained within the mechanical splice connector to bend controllably within the cavity. The fiber stub bends controllably within the cavity as the field fiber is inserted past the point of contact with the stub. The stub then acts as a spring, creating a reacting force on the fiber joint. The spring force by the stub is proportional to the amount of over-insertion of the field fiber. By precisely controlling this over-insertion, the amount of buckling and thus the spring force can be precisely controlled. Temperature differences may result in minute changes in the length and bending characteristics of the fiber stub and also the connector housing components. The amount of buckling may be selected such that the stub fiber is buckled and in a linear force region. In accordance with Hooke's law, the amount of reacting force applied by the fiber stub to the field fiber as the field fiber is inserted past the point of contact initially increases in direct proportion to the translation as the stub compresses. However, once the stub buckles, the force becomes constant. Therefore, as the stub fiber remains in the buckled condition, the reaction force applied by the stub fiber on the field fiber may remain constant.

In another aspect of an exemplary embodiment, the stub fiber of the optical connector is pre-selected to provide the necessary axial force when engaged with an inserted field fiber. The stub fiber preferably bends to the desired buckling radius without damage to the stub fiber. Optical fiber subject to long term bending may be prone to breakage due to critical flaw propagation. In order to minimize such breakage, either the critical flaw size due to surface damage is reduced or the stress due to bending is reduced below a critical level. In preferred embodiments, stripping methods which minimize surface damage should be employed. Toughened glass, such as fiber having a titania doped outer surface may be used to reduce the size of the flaws the fiber encounters during stripping. In another embodiment of the present invention, a stub fiber made from a plastic-clad 125 micron outer diameter optical fiber may be used. Plastic clad fiber has an enhanced ability to bend because the smaller glass outer diameter reduces the stress on the stub fiber while the plastic cladding prevents any surface damage to glass. Finally, a surface treatment, such as silane, may be applied to the fiber stub to make it more resistant to flaw propagation.

Another aspect of the invention includes a protrusion on the interior of the buckling cavity to force a slight bend into the stub fiber in its unmated state. By inducing this bend, the stub is pre-buckled, and the reaction force applied to the field fiber as it is inserted is constant as previously discussed. This results in a less craft sensitive installation as there is no abrupt reduction in force at the buckling point as the force shifts from linearly increasing to constant.

Yet another aspect of the present invention involves the tool used to install a field fiber within the connector of the present invention. The improved tool is closely related to the tool currently in use with a variety of mechanical splice connectors. The present invention improves on the prior art tool by incorporating the use of a sled structure for introducing the optical field fiber into the mechanical splice connector. The sled structure runs along a track designed within the installation tool. In an exemplary embodiment of the present invention, the sled structure also presents the optical fiber to the stripping and cleaving tools to accurately control the cleaving length and minimize errors due to handling. Therefore, a single device can be used to handle the fiber during cleaving, stripping, and installation of the fiber into the connector. After cleaving and stripping, the optical field fiber is still contained within the sled structure and placed within the track incorporated into the installation tool. The sled structure is then used to precisely guide the optical field fiber into the receiving end of the mechanical splice connector according to the present invention. When the optical field fiber exerts positive pressure onto the sled, the optical field fiber is in engagement with the fiber stub. The sled is then moved a predetermined distance further toward the mechanical splice connector. This forces the optical field fiber slightly further into the mechanical splice connector and causes the stub fiber contained within the optical connector to buckle controllably.

Additional features and advantages of the invention are set forth in the detailed description which follows and will be readily apparent to those skilled in the art from the description, or will be readily recognized by practicing the invention as described in the detailed description, the drawings and the appended claims.

It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and description are meant to be merely illustrative, and are not intended to limit the scope of the claims in any manner.

BRIEF DESCRIPTION OF THE DRAWINGS

FIGS. 2A and 2B show a prior art ferrule optical connector that utilizes index matching gel. FIG. 2A shows the connector without a field fiber engaged thereto. FIG. 2B shows a field fiber engaged within the optical connector.

FIG. 4A shows the connector of FIG. 3A with a protrusion incorporated into the cavity structure to induce bending of the fiber stub thereby encouraging it to buckle without first compressing. FIG. 4B shows the connector according to the present invention with a field fiber inserted and engaged within the connector.

DETAILED DESCRIPTION OF THE INVENTION

Although the figures and following description are intended to provide a full disclosure of the present invention, including the preferred embodiment, such that a person of ordinary skill in the art may practice the invention, the embodiments shown and discussed subsequently are not intended to limit the scope of the present invention. The inventor contemplates that minor modifications and variations are within the scope of the present invention.

Figure 1A:
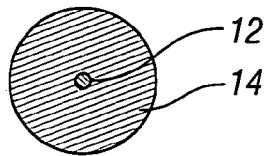
FIGS. 1A, 1B, and 1C show cross-sectional views of various types of optical fibers.
Figure 1B:
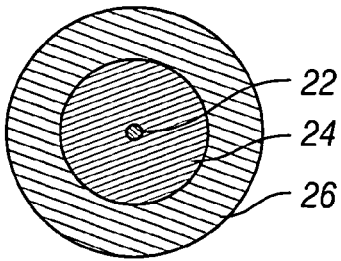
Figure 1C:
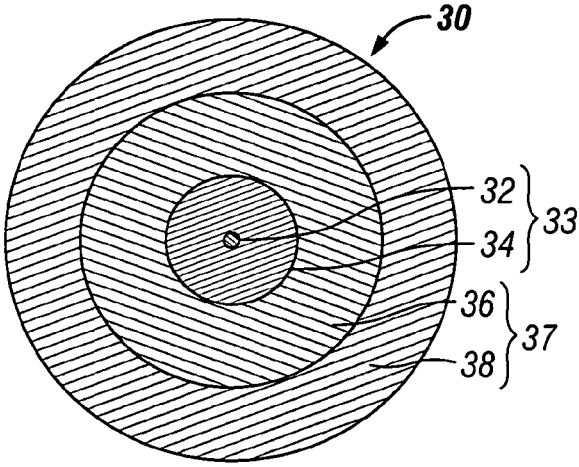

Referring now to FIGS. 1A-1C, three cross-sectional views of three different optical fibers are depicted. Each type of optical fiber may be relevant in the present invention. The figures are not to scale between one another nor is the relative thickness of each layer accurately portrayed. FIG. 1A depicts a typical optical fiber 10. The optical fiber 10 is comprised of a core 12 and a cladding 14. The core 12 and the cladding 14 are generally comprised of silica for optimum performance of the optical fiber. The cladding 14 features a lower refractive index than the core 12 so that the optical energy directed down the core is continually reflected back into the core by the core-cladding interface, thereby ensuring a minimal amount of leakage out of the core 12.

FIG. 1B is an example of a plastic coated optical fiber 20 that could be utilized as a stub fiber in the present invention. The core 22 of the plastic coated optical fiber 20 is identical to that of the typical optical fiber 10. The core 22 of the plastic coated optical fiber 20 is also comprised of glass and has a diameter of approximately the same dimensions as the core 12 of the typical optical fiber 10. The cladding 24 of the plastic coated optical fiber 20 surrounds the core 22 and has a lower refractive index than that of the core 22. The cladding 24 of the coated optical fiber 20 serves the same function of ensuring that the optical energy traveling down the core 22 is maintained within the core 22 along the length of the coated optical fiber. Finally, encompassing the cladding 24 is a permanent plastic coating 26. The plastic coating 26 may be made of any material known in the art suitable for installing on a glass fiber. The plastic coating 26 forms an integral part of the fiber and is normally not removed during connectorization or splicing. The plastic coating 26 provides protection to the optical fiber 20. Specifically, the cladding 24 and core 22 are susceptible to the introduction of scratches on the outer surface of the cladding 24 which can affect the strength of the fiber. Futhermore, the integral plastic coating which has an outer diameter substantially the same as the cladding of fiber 10, forms the alignment surface of the fiber within the splice. Finally, the inclusion of the plastic coating reduces the diameter of the glass cladding 24 to a diameter smaller than that of the fiber 10 with cladding 14. The reduced cladding diameter makes the fiber less stiff, thus more easily buckled by reducing its area moment of inertia. This reduced diameter also results in lower stress on the glass portion of the fiber in bending, as bending stress is directly proportional to the radius of the fiber.

FIG. 1C is a cross-section of a buffered optical fiber 30. The buffered optical fiber is similar to the typical optical fiber 10, but contains additional protective layers that enable the buffered optical fiber 30 to be handled more easily by an installer in the field. The delicate nature of the bare optical fiber 10 prevents any direct handling of the optical fiber without special tools and a clean environment. Accordingly, the buffered optical fiber 30 comprises a core 32 of approximately the same dimensions as the core 12 of the bare optical fiber 10 and the core 22 of the plastic coated optical fiber 20. A glass cladding 34 featuring a refractive index lower than that of the core is provided around the outside of the core as shown in other prior art optical fibers. The combination of the core 32 and the cladding 34 forms the bare glass fiber 33 that will be discussed throughout the present invention. Outside of the bare glass fiber 33, protective acrylate 36 is applied at the factory. In some embodiments, surrounding the protective acrylate 36 is a PVC buffer 38. The combination of the PVC buffer 38 and the protective acrylate 36 forms the protective layers 37 of the optical fiber. While the present invention is explained with reference to a tight-buffered optical fiber wherein the protective acrylate 36 and PVC buffer 38 are provided on the optical fiber 30 from the factory, it is well within the contemplation of the present invention to utilize other materials for the protective layers 37. Furthermore, it is also contemplated that the PVC buffer 38 may be replaced with a loose-buffer such as a furcation tube that is not factory-installed, but is rather field-installed on any type of coated optical fiber 33 with coating 36. For example, in some installations thick protective jackets may be removed from the optical field fiber cable exposing coated optical fiber 33 with coating 36. In order to provide a mechanical splice connector according to the present invention, the coated optical fiber (33 and 36) must be "up-jacketed" to a thicker diameter with a protective jacket, such as a 900 micron loose-buffer furcation tube to enhance mechanical robustness of the connector-fiber interface, before a connector may be attached thereto.

Referring now to FIG. 2A, a prior art mechanical splice connector 100 is depicted to assist in better understanding the improvements of the present invention. The connector 100 has a body 110 and a ferrule 112 extending away from the body. The ferrule 112 is generally comprised of a ceramic or ceramic-like material. By using material such as ceramic and encasing a stub fiber 130 within the ferrule 112, a robust connector is produced that can accurately mate, disconnect, and subsequently remate with adapters suitable for accepting ferrule connectors. Also, the exposed end of the fiber stub 130 at the ferrule end 132 is factory cleaved and polished to provide excellent optical connectivity properties that cannot be easily achieved with tools used in the field. A protective dust cap (not shown) is generally provided to protect the polished end of the fiber stub 130 from damage prior to installation.

The fiber stub 130 extends from the ferrule tip 132 through the ferrule 112 and into the body 110. In the prior art, the fiber stub 130 generally has the same structural characteristics as a typical optical fiber 10 such as the optical fiber depicted in FIG. 1A. The fiber stub 130 of the prior art mechanical splice connector 100 has a core 12 sized to match the optical fiber that the connector 100 is designed to attach thereto. For example, if the mechanical splice connector 100 is intended to mate with single mode optical fiber having a core diameter of about 8 microns, the fiber stub 130 will feature a core with a diameter of about 8 microns. The fiber stub 130 has an internal end 134 that terminates within the interior of the connector 100. In some prior art designs, the fiber stub terminates within an alignment mechanism 124. In the depicted prior art device, the alignment mechanism 124 is a camming mechanism, however other types of alignment mechanisms are known in the art. The operational characteristics of the camming mechanism will be better explained with reference to FIGS. 5A, 5B, and 5C discussed herein. However, for purposes of considering the prior art mechanical splice connector, the alignment mechanism 124 will be considered generically as any structure that aligns the optical field fiber and fiber stub and maintains them in position. Therefore, the fiber alignment mechanism 124 is represented by an upper alignment structure 120 and a lower alignment structure 122. The optical connector also contains a metal crimp tube 114 that is engaged with securing the optical field fiber to the mechanical splice connector 100 after installation. The optical connector also features a conical lead-in 116 for guiding the optical field fiber into the alignment mechanism 124. The cavity in the connector housing 110 which accepts the alignment mechanism 124 is filled with an index matching gel or fluid 150.

Referring now to FIG. 2B, the prior art mechanical splice connector is shown with an optical field fiber locked into position within the connector 100. The terminating end of the field fiber 33a is essentially abutting the terminal end of the fiber stub 134. Within the extremely small area between these two ends, the index matching gel 150 ensures that the index of refraction between the fiber cores remains constant. Excess matching gel fills the remaining open areas of the optical connector. After successful alignment, the fiber stub 130 and the optical field fiber 33 are now locked into position. To provide additional strain relief and additional physical reinforcement, the metal crimp tube 114 is crimped down on the protective layers 37 surrounding the optical field fiber 33. Such crimping is not shown in the drawings, but is well known in the art.

Figure 3A:
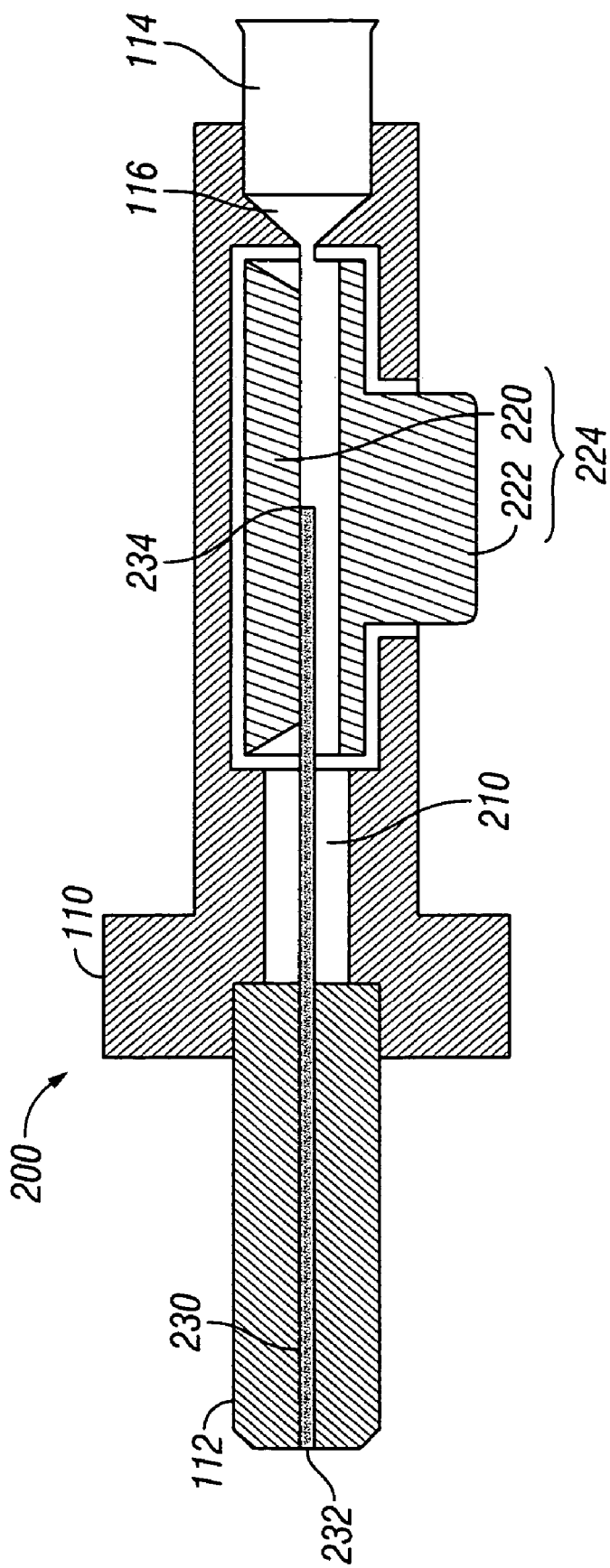
FIG. 3A shows an embodiment of the present invention without a field fiber engaged with the fiber stub.

FIG. 3A depicts a simplified embodiment of a ferrule connector 200 according to the present invention. The ferrule connector 200 is constructed from an outer housing 110 and a ferrule 112 like the ferrule connector of the prior art 100. Located within the ferrule and oriented along the longitudinal axis of the ferrule connector 200 is a fiber stub 230. In this embodiment, the fiber stub 230 is similar to the optical fiber depicted and described with reference to FIG. 1B. The fiber stub 230 has one end that terminates at the tip of the ferrule 112. The terminal end of the fiber stub 232 is factory cleaved and polished to provide a robust and effective connection when engaged with other suitable connectors. The internal end 234 of the fiber stub 230 is laser shaped or machine polished and located within the housing 110 of the connector 100. It is polished to a slightly convex shape as this design has been found to be the most effective in creating physical contact between the fiber stub 230 and a field fiber 33 (shown in FIG. 3B). The internal end of the fiber stub 234 is maintained roughly in position by an upper fiber restraining structure 220, also referred to herein as an "upper splice component". In the present embodiment, the lower fiber alignment structure 222, also referred to herein as a "lower splice component" has a small indention that runs along the upper surface of the lower alignment structure 222. The indention may be V-shaped and sized such that it serves to contain any lateral movements of the fiber stub 230 when the fiber alignment mechanism 224 is locked into position (see FIGS. 5A-5C and 6A-6C for cross-sectional views of alignment mechanisms suitable for the present invention).

As depicted in FIG. 3A, an exemplary embodiment of the present invention features an internal cavity 210 defined by the housing 110. The fiber stub 230 extends from the ferrule 112 and through the internal cavity 210. In the normal relaxed, unengaged status shown in FIG. 3A, the inherent stiffness of the fiber stub 230 prevents any bending of the fiber stub 230 within the cavity 210.

Figure 3B:
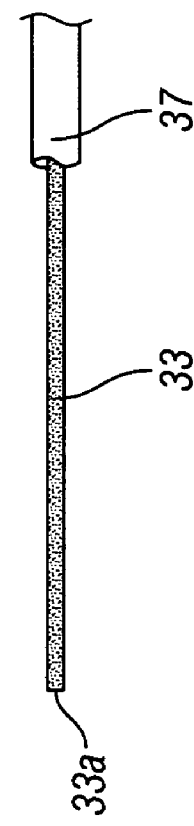
FIG. 3B shows the outer protective coating of an optical fiber.

FIG. 3B depicts a field fiber 33 with a protective layer 37 protecting a length of the optical field fiber 33. The protective layer 37 generally consists of an acrylate layer and PVC buffer. This protective layer 37 is removed along a certain length of the optical field fiber 33 depending on the length needed to insert the optical fiber into the ferrule connector 200 according to the present invention. The terminal end 33a of the optical field fiber 33 is field cleaved to provide an appropriate geometry for engaging the fiber stub 230 within the ferrule connector 200.

Figure 3C:
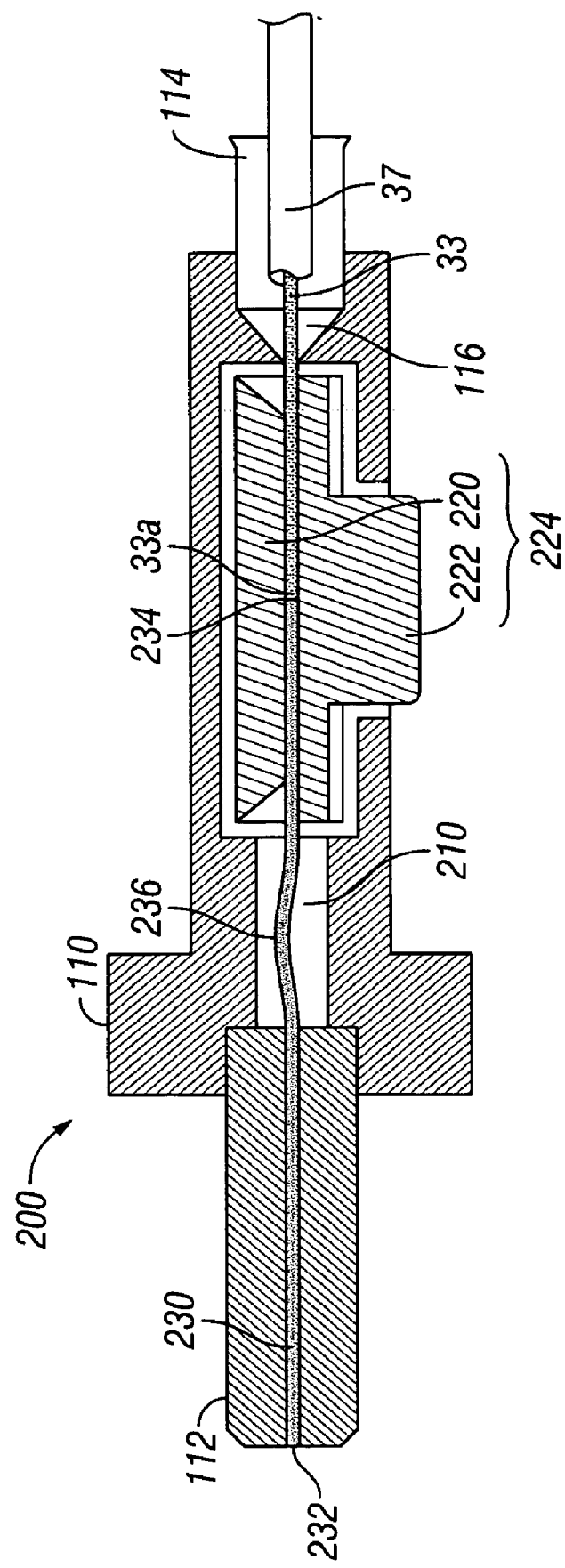
FIG. 3C shows the connector of FIG. 3A with the fiber inserted and the stub fiber in the buckled state.

Referring now to FIG. 3C which depicts the ferrule connector 200 according to the present invention with the optical field fiber 33 installed within. As in FIG. 3A, the connector 200 is comprised of a housing 110, a ferrule 112, with a fiber stub 230 extending along the longitudinal axis of the connector. In this embodiment, the terminal end 33a of the optical field fiber 33 is in engagement with the internal end 234 of the fiber stub 230. In this depiction, a force has been exerted onto the field fiber 33 as it is secured within the connector 200. The fiber stub 230 forms a small buckle 236 within the internal cavity 210. After the optical fiber 33 is placed within the connector 200 and the fiber stub 230 has buckled slightly thereby providing an opposing force to the force exerted by the field fiber, the fiber alignment mechanism 224 is locked into position. After locking the fiber alignment mechanism 224 into position, the glass of the optical field fiber 33 is securely held within the connector and aligned precisely with the fiber stub 230. The field fiber 33 is also locked into position and does not move either laterally or longitudinally. However, the fiber stub 230 is only held in position laterally ensuring proper alignment, but the fiber stub 230 is allowed to move along the longitudinal axis of the connector so that the buckle in the connector provides the spring-like loading effect forcing the terminal end 234 of the fiber stub 230 and the cleaved end 33a of the optical field fiber 33 into constant contact and alignment.

Figure 4A:
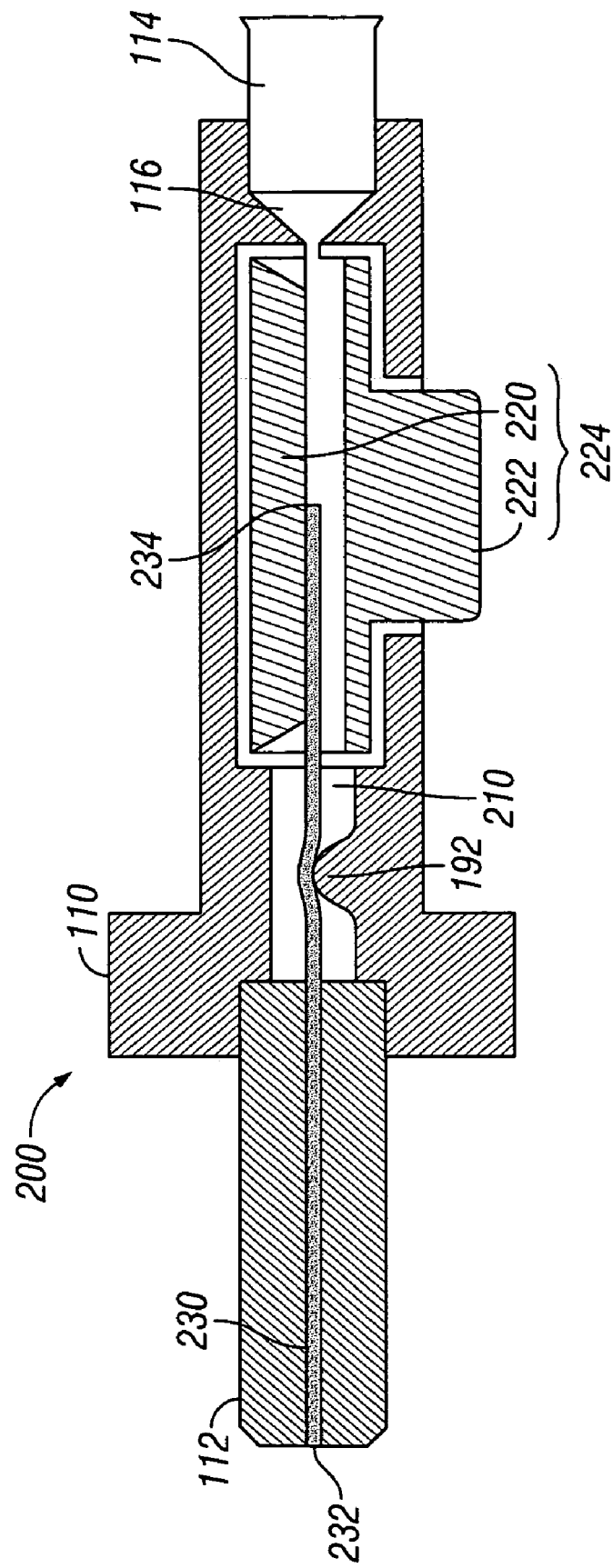
FIGS. 4A and 4B show the same optical connector of FIGS. 3A and 3C further comprising a protrusion within the cavity to "pre-buckle" the fiber stub.
Figure 4B:
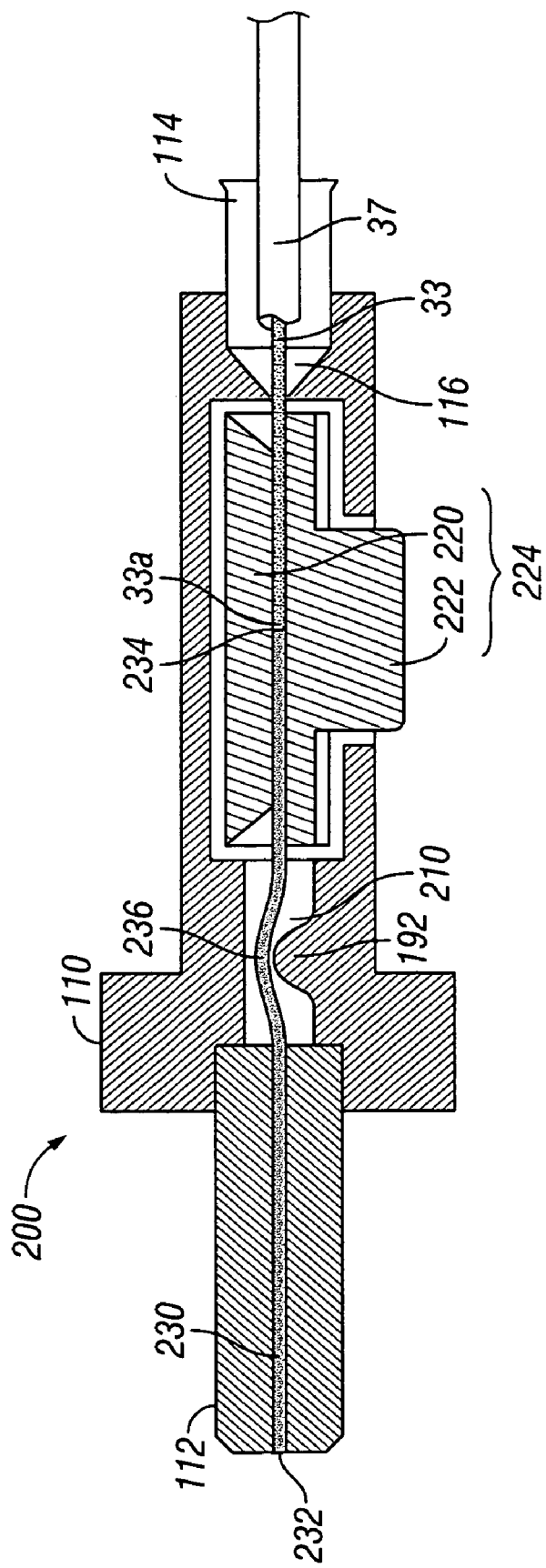

FIG. 4A depicts an optical connector according to the present invention including a bending protrusion 192 located within the cavity 210 which forces fiber stub 230 into an initial bend 236 (FIG. 4b) in the relaxed state. When field fiber 33 is inserted, the force required to buckle the fiber into a final bent 236 state shown in FIG. 4B is more linear as the fiber stub 230 does not first compress prior to buckling.

Figure 5A:
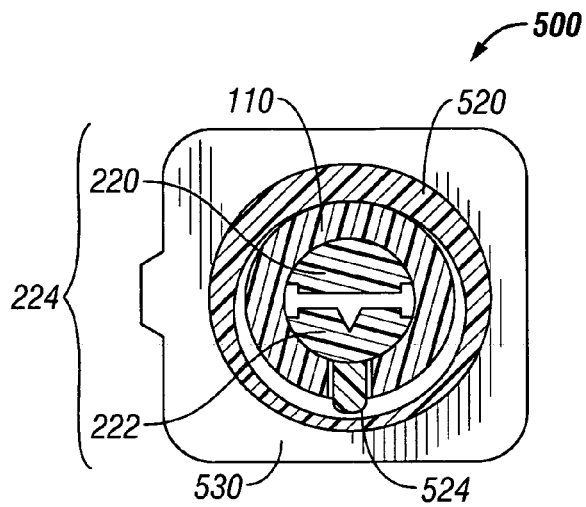
FIGS. 5A-5C show a cross-sectional view of a prior art alignment mechanism for a mechanical splice connector that uses a V-grooved alignment and camming structure to accurately align the optical field fiber and internal fiber stub. The camming mechanism locks the upper and lower structures of the alignment mechanism into position and therefore locks the optical field fiber and internal fiber stub in position.

Referring now to FIG. 5A, a fiber alignment device of the present invention as is known in the art is shown as the basis for the improvement of the present invention. The present invention utilizes the cam alignment device described in detail in U.S. Pat. No. 6,173,097 and the contents of the patent are hereby incorporated. The outer structure of the cam 530 has an eccentric ring 520 contained therein that rotates with the outer structure 530. Located within the eccentric ring 520 is a connector housing 110 that has a slot in its lower surface allowing actuating member 524 of alignment mechanism 222 to protrude through and which maintains its position regardless of the rotation of the cam around the center axis.

Figure 5B:
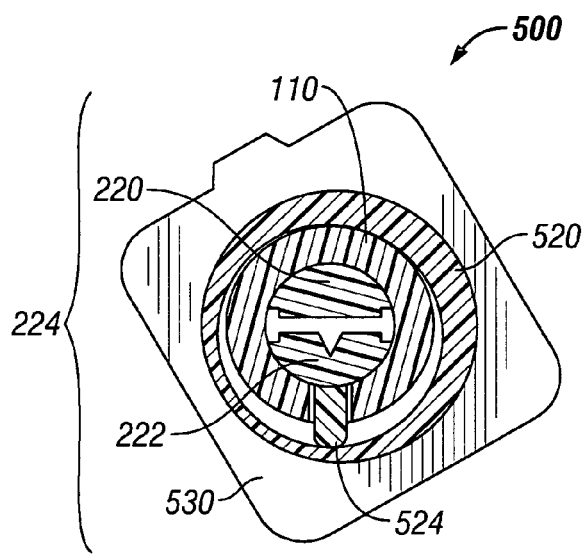
Figure 5C:
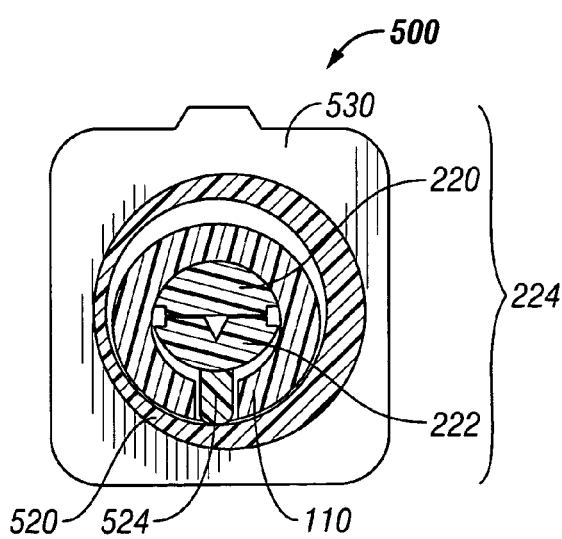

FIG. 5B shows an approximate 45 degree rotation of the cam structure. Here, the eccentric 520 is rotating around the connector housing 110. The lower fiber alignment structure 22 has an extending actuator 524 located below the alignment structure. As the eccentric 520 turns it forces element 524 upward thereby forcing the lower fiber alignment structure 222 into engagement with the upper alignment structure 220. FIG. 5C shows the camming operator 500 after a full 90 degree rotation thereby locking the fibers into position. The extending actuator 524 has forced the lower fiber alignment structure 222 into a full locking engagement with the upper fiber alignment structure 220.

Figure 6A:
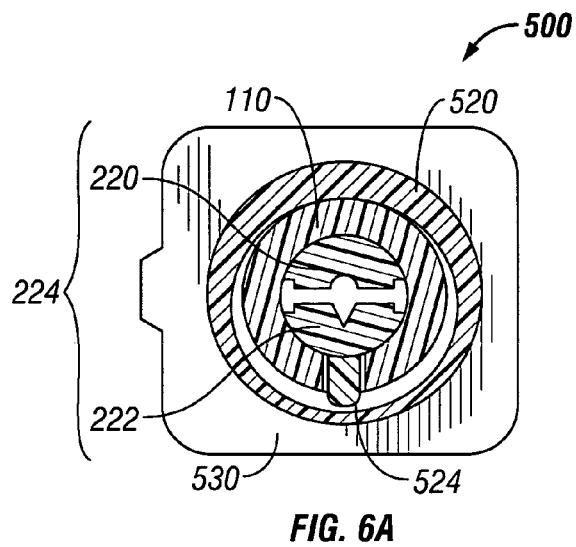
FIGS. 6A-6C shows a modification of the prior art alignment mechanisms according to the present invention.
Figure 6B:
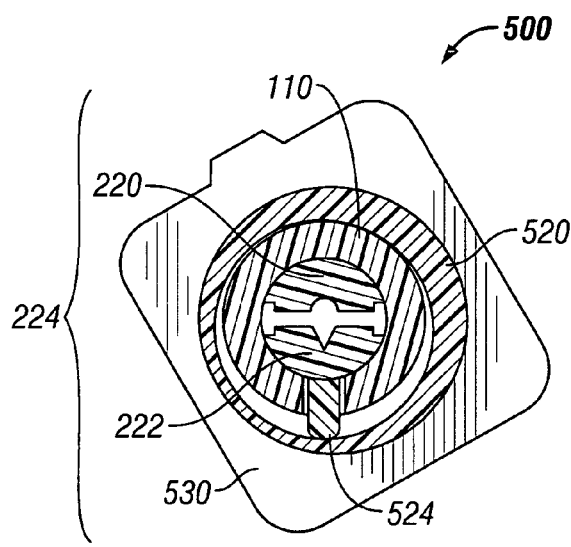
Figure 6C:
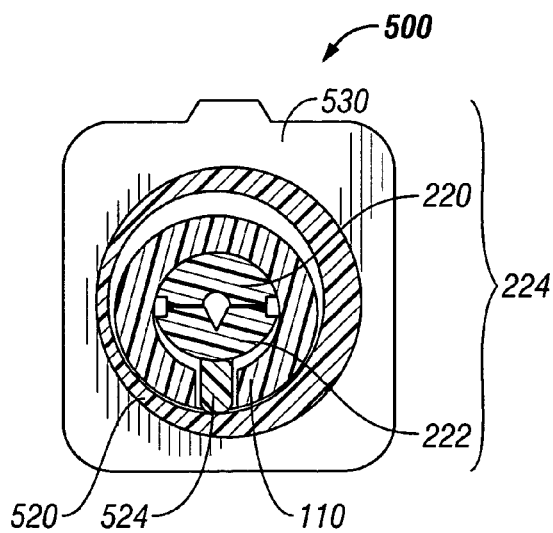

Referring now to FIG. 6A, an improved camtype fiber alignment mechanism as shown in FIGS. 5A, 5B, and 5C is depicted according to the present invention. The camming operator 500 is shown in the unengaged position. As before, the camming structure comprises an outer body structure 530, an eccentric ring 520 contained within the outer body structure 530, and a connector housing 110 for holding the alignment mechanism 224 in position. The alignment mechanism 224 is comprised of an upper actuating surface 220 and a lower actuating surface 222. Like the prior art, the lower actuating surface 222 contains a Vshaped groove for holding the fiber in position. The mechanism depicted in FIGS. 6A-6C operates in a similar manner as the mechanism depicted in FIGS. 5A-5C except the upper surface 220 features a small indention running along the length of the surface corresponding to the length of the stub fiber. This indention in the upper surface 220 provides additional clearance for the stub fiber (not shown) to move axially but remain constricted in the lateral directions after camming. In practice, the indentation may be applied equally to the top and bottom alignment surfaces to minimize lateral offset induced by the indentation. The indention may alternatively run the length of one or more of actuating surfaces 220 and 222.

Figure 7:
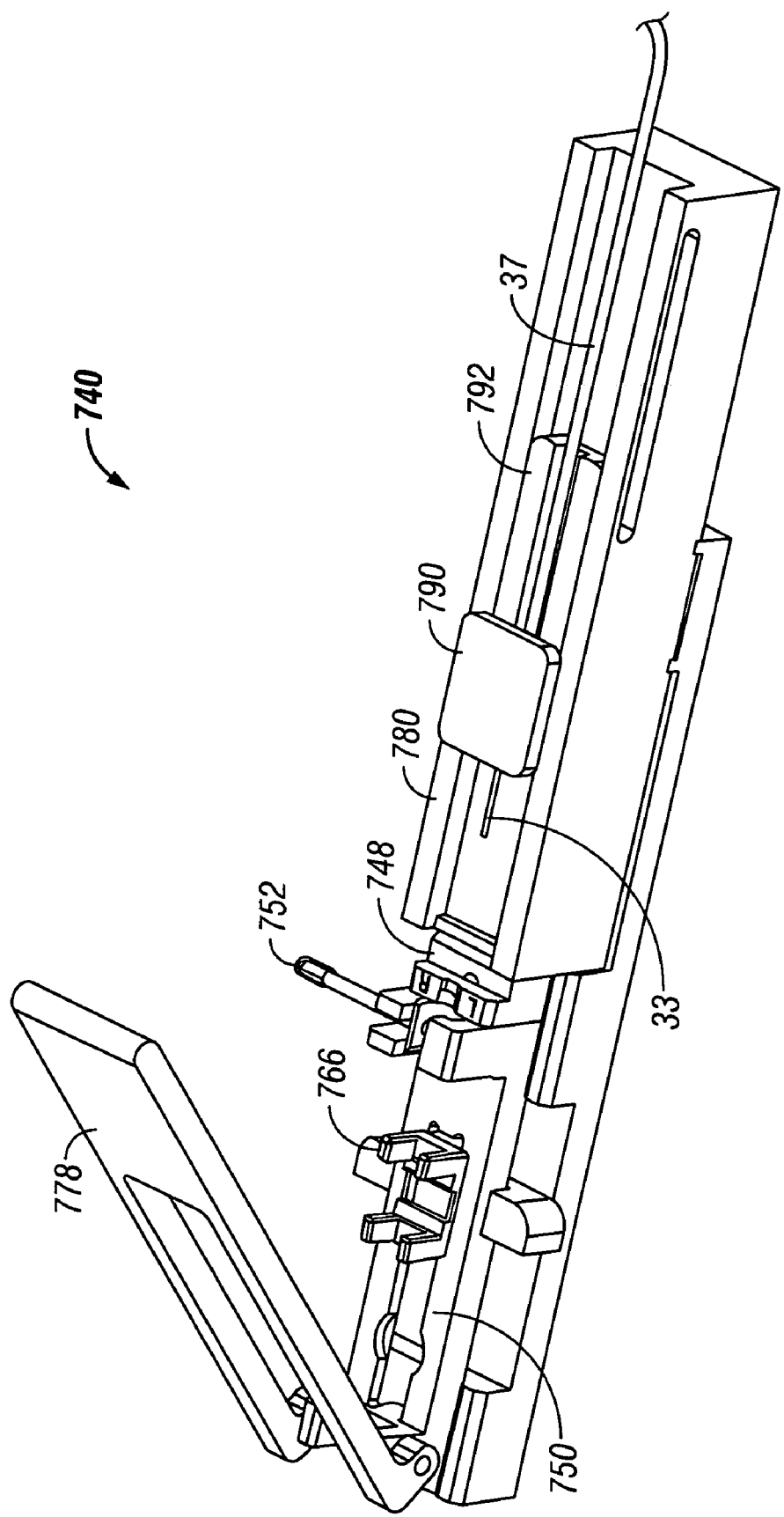
FIG. 7 shows a tool suitable for use with the present invention for installing a mechanical splice connector onto an optical fiber.

Referring now to FIG. 7, an exemplary embodiment of a tool for installing a fiber optic cable within a mechanical connector according to the present invention is depicted. The installation tool 740 features tool housing 750 and attached thereto is an anvil 748 for facilitating the crimping of a crimp tube, if present, during assembly of the fiber optic connector. The tool housing 750 also features a wrench 752 mounted to the tool housing for engagement of a cam member of the fiber optic connector and permitting actuation thereof. Also provided within the present invention is a connector holder 766 which provides stability and holds the connector in position as the field fiber is installed therein. Further, the installation tool 740 also comprises an arm 778 that is pivotally connected to the housing 750. The arm 778 lowers onto a connector after camming the connector and works in conjunction with the anvil 748 to provide a crimp of the crimp tube on the end of a mechanical splice connector as disclosed herein.

According to the present invention, the tool 740 further comprises the improved features of having slide rails 780 to allowing a sled 792 to be placed therein. The sled 792 slides freely along the length of the slide rails and allows for precise insertion of the optical fiber 33 into the connector when placed within the installation tool 740. The sled 792 also comprises a top member 790 to hold the optical fiber within the sled 792. As shown, the optical fiber 33 extends away from the sled in one direction while the protected optical fiber with protective layers 37 is shown extending from the rear of the sled.

Figure 8:
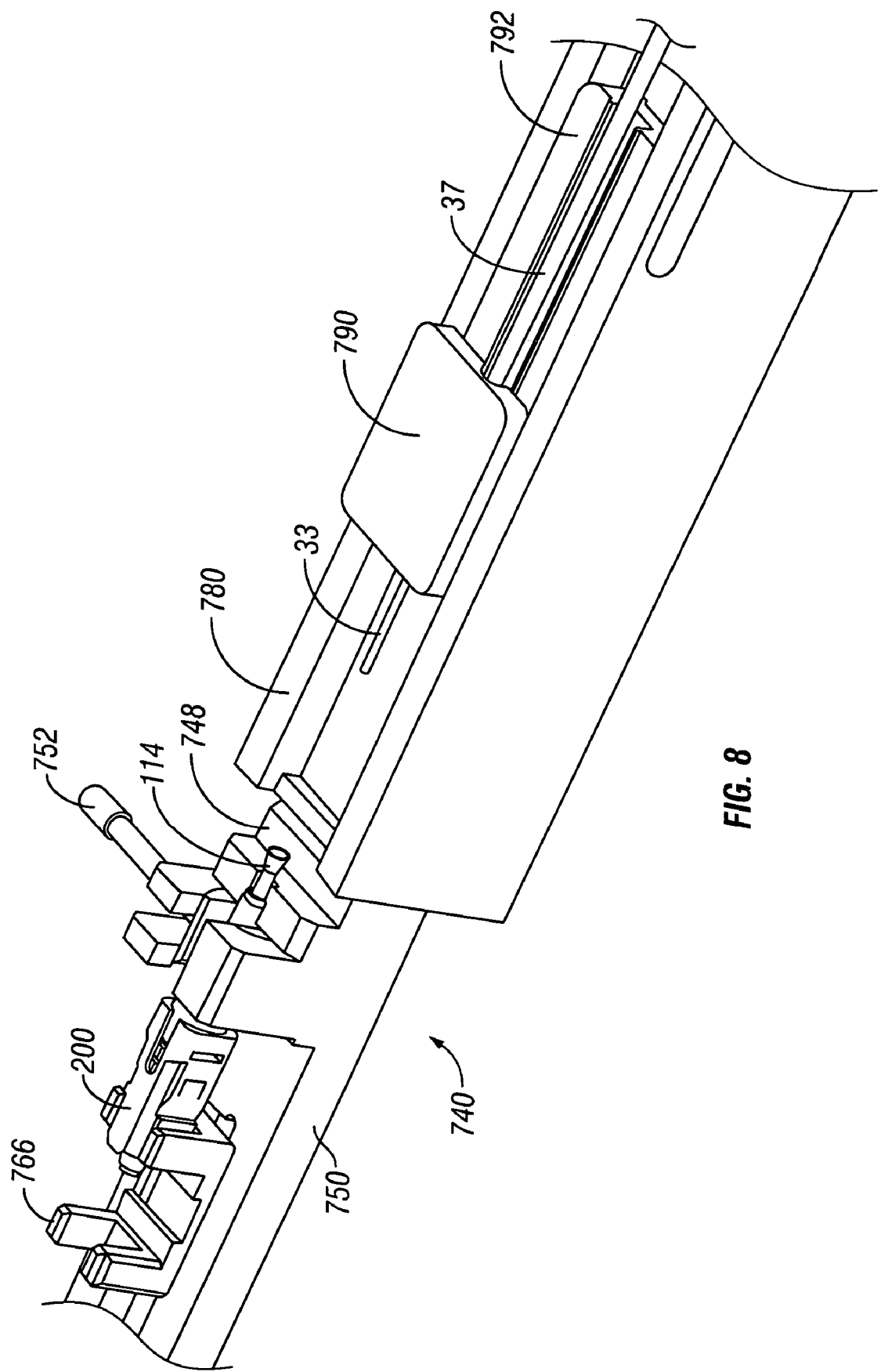
FIG. 8 is an enlarged depiction of a portion of the tool suitable for installing the optical fiber onto a mechanical splice connector according to the present invention. This enlarged depiction also shows the mechanical splice connector positioned within the tool and prepared for accepting the optical fiber.

Referring now to FIG. 8, an enlarged view of the installation tool 740 according to the present invention is shown. However, in this view, a connector 200 also according to the present invention is placed within the installation tool 740. As can be seen, the tool housing 750 is shown with the connector 200 placed within the connector holder 766. In this view, the wrench 752 in a downward position. Depending on the connector design, the connector may either be installed by lowering or raising the wrench 752 to activate a camming mechanism within the connector 200. Extending from the connector is a crimping tube 114 placed on the anvil 748. Although not shown in FIG. 8, the anvil works in conjunction with the arm 778 to crimp the tube on the protective fiber coating 37 after installation.

For installation, the sled 792 is positioned within the slide rails 780. The sled 792 has an optical fiber 33 extending out the front of the sled while the optical fiber 33 with a protective jacket 37 surrounding the optical fiber extends out the rear of the sled 792. An upper surface of the sled 790 holds the optical fiber 33 in position during the installation process. As the sled is moved down the slide rails 780, the optical fiber 33 is inserted into the crimp tube 114 and guided into position within the connector 200. When the optical fiber 33 engages the fiber stub contained within the connector 200, a small positive force is exerted on the optical fiber 33. By using precise measurements on the sled 792, slide rails 780, or within the connector itself 200, the optical fiber 33 is further inserted a small distance into the connector 200 to cause the buckling necessary for the present invention. After installation of the fiber is precisely accomplished resulting in the small buckling, the wrench 752 is moved into the alternative position thereby actuating the camming mechanism of the connector 200 and locking the optical fiber 33 into position. The fiber stub contained within the connector is precisely aligned with the optical fiber but may move slightly along the longitudinal axis providing the axial load necessary to maintain good physical connection between the optical field fiber and the fiber stub as shown in FIG. 4.

In alternative embodiments, connector structure may be modified to include various fiber alignment components and alignment surfaces. In addition, alternative designs for camming structures may be practiced within the scope of the present invention, such as but not limited to, simultaneous and multi-step camming mechanisms for buffer retention and fiber alignment. The connector structure may be further modified to include space for field fiber buckling and may include a bending protrusion for causing the field optical fiber to bend. The connector may further include alternative apparatus for retaining a coated portion and/or a buffered portion of the field fiber, thus replacing the crimping feature while providing reversible and non-destructive terminations. In all connector embodiments, at least one of the camming mechanism, the fiber restraining structure, the fiber aligning structure and the connector body are translucent so as to detect visible or invisible light, such as from a light source of a VFL, through all or a portion of the connector structure in order to verify optical continuity. Optical continuity may be determined using a Continuity Test System (CTS) or other known test system.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. An optical fiber mechanical splice connector for coupling with a field fiber, comprising:
    a connector body having a fiber alignment mechanism and having a cavity, the fiber alignment mechanism including an upper actuating surface with an indentation feature and a lower actuating surface with another indentation feature, and wherein the connector body defines a protrusion feature that protrudes into the cavity;
    a ferrule coupled to the connector body;
    a stub fiber having a portion captured within the ferrule, wherein the stub fiber extends from the ferrule through the cavity of the connector body and in contact with the protrusion feature to place an initial bend in a portion of the stub fiber to facilitate buckling of the stub fiber, and wherein an end of the stub fiber is positioned within the fiber alignment mechanism between the upper actuating surface and the lower actuating surface; and
    wherein the stub fiber is configured to buckle within the cavity when the field fiber is introduced into the connector body and contacts the end of the stub fiber.

2. The splice connector of claim 1, wherein the protrusion feature causes the stub fiber to buckle prior to inserting the field fiber into the splice connector.

3. The splice connector of claim 1, wherein the fiber alignment mechanism is configured to constrain lateral and axial movement of the field fiber and constrain lateral movement of the stub fiber.

4. The splice connector of claim 3, wherein the fiber alignment mechanism is configured to permit axial movement of the stub fiber while constraining lateral and axial movement of the field fiber.

5. The splice connector of claim 1, wherein the fiber alignment mechanism is operable for strain relieving a coated portion of the field fiber.

6. The splice connector of claim 1, wherein an end of the stub fiber extends from the ferrule through the cavity of the connector body and into the indentation feature of the upper actuating surface of the fiber alignment mechanism.

7. The splice connector of claim 1, wherein the alignment mechanism is actuated by a rotation of a camming mechanism.

8. The splice connector of claim 7, wherein at least one of the camming mechanism, the fiber alignment mechanism and the connector body are translucent so as to detect visible or invisible light through all or a portion of the connector structure.

9. The splice connector of claim 1, further comprising a crimp tube for receiving a buffer of the field fiber.

10. The splice connector of claim 1, wherein the indentation feature of the lower actuating surface comprises a V-shaped groove.

11. The splice connector of claim 1, wherein the sub fiber extends into the indentation feature of the upper actuating surface of the fiber alignment mechanism.

12. The splice connector of claim 1, wherein the initial bend in the portion of the stub fiber facilitates buckling of the stub fiber resulting from a substantially linear axial force applied by the field fiber to the stub fiber.

13. A method of mechanically splicing a field fiber and a stub fiber of a splice connector, comprising:
    providing an installation tool with a connector holder, a slide engagement structure, and an actuating structure;
    placing the splice connector within the connector holder;
    operating the slide engagement structure to introduce the field fiber to the splice connector and apply an axial force to the field fiber wherein the field fiber applies the axial force to the stub fiber to cause the stub fiber within the splice connector to buckle; and
    operating the actuating structure to activate an alignment mechanism of the splice connector to lock the field fiber into position with respect to the splice connector and align the stub fiber with respect to the field fiber.

14. The method of claim 13, wherein the slide engagement structure further comprises at least one slide rail and a sled, wherein the sled is moved along the slide rail to cause the field fiber to be introduced to the splice connector.

15. An optical fiber mechanical splice connector for coupling with a field fiber, comprising:
- a connector body having a cavity, wherein the connector body defines a protrusion feature that protrudes inside the cavity;
- a ferrule coupled to the connector body; and
- a stub fiber having a portion captured within the ferrule, wherein the stub fiber extends from the ferrule through the cavity of the connector body and in contact with the protrusion feature to place an initial bend in a portion of the stub fiber to facilitate buckling of the stub fiber;
- wherein the stub fiber is configured to buckle within the cavity of the connector body when the field fiber is introduced into the connector body and contacts the end of the stub fiber.

16. The splice connector of claim 15, wherein the initial bend in the portion of the stub fiber facilitates buckling of the stub fiber resulting from a substantially linear axial force applied by the field fiber to the stub fiber.

* * * * *